United States Patent

Ruffler

Patent Number: 5,090,223
Date of Patent: Feb. 25, 1992

[54] CAR THEFT DETERRENT TO DEFLATE TIRE

[76] Inventor: John Ruffler, 69 Hudson Ave., Irvington, N.Y. 10533

[21] Appl. No.: 625,432

[22] Filed: Dec. 11, 1990

[51] Int. Cl.[5] ............... B60R 25/00; F16K 35/10
[52] U.S. Cl. ..................... 70/175; 70/178; 70/225; 70/232; 70/237; 116/33; 137/68.1; 137/223
[58] Field of Search ............. 70/225, 226, 237, 258, 70/259, 260, 232, 175-178, 179, 180; 116/33; 137/68.1, 223

[56] References Cited

U.S. PATENT DOCUMENTS

| | | | |
|---|---|---|---|
| 1,426,119 | 8/1922 | Southard | 70/232 |
| 1,538,843 | 5/1925 | Stanley | 70/260 |
| 4,375,200 | 3/1983 | Bertani et al. | 70/259 X |
| 4,651,849 | 3/1987 | Givati | 70/225 X |
| 4,969,342 | 11/1990 | Marchiori | 70/225 X |

Primary Examiner—Lloyd A. Gall
Attorney, Agent, or Firm—Philip Furgang

[57] ABSTRACT

A substantially "U" shaped break-away-bar assembly is constructed to a size and configuration to fit about a portion of an air-inflated vehicle tire. A key actuated lock latching assembly is carried by the break-away-bar assembly and includes an internally threaded connection member utilized to selectively connect the latching assembly to the external threads normally provided on a valve-stem of a tire rim for an air inflated vehicle tire. Operation of the key actuated lock to its locked condition prevents disconnection of the latching assembly from the valve stem. When the break-away-bar assembly is positioned about the vehicle tire and the latching assembly threadably connected to the valve stem rotation of the vehicle tire so that the bar assembly moves beneath the tire, rips the valve stem out of its seat and permits relatively rapid escape of the air from the tire. Slip joints provided for the break-away-bar assembly permit selective adjustment thereof to accommodate different size tires. Angular disposition of a cross-arm connecting spaced legs of the break-away-bar assembly together result in coaction of the tire and break-away-bar assembly to either pull the valve stem down and out or up and in and out.

20 Claims, 2 Drawing Sheets

CAR THEFT DETERRENT TO DEFLATE TIRE

BACKGROUND OF THE INVENTION-FIELD OF APPLICATION

This invention relates to car theft deterrent devices or automobile anti-theft devices as they may otherwise be called; and, more particularly to such deterrent or anti-theft devices which disable the vehicle.

BACKGROUND OF THE INVENTION-DESCRIPTION OF THE PRIOR ART

Vehicles of all types (cars, trucks, recreational vehicles, etc.) are stolen each day and in such significant numbers to make stolen vehicles a major problem. This major problem not only affects the public in general by resulting in higher insurance premiums and in the expense of police personnel assigned to deal with vehicle thefts but it also affects the person whose vehicle is stolen. They not only must deal with the paperwork required to report the theft and to collect from the auto insurance company but they also must deal with alternate means of transportation and the resulting expense.

Many vehicles are stolen by youths out for a joy ride who abandon the vehicle after the joy ride but quite often after the vehicle is damaged. A significant number of auto thieves are professionals who expeditiously take the vehicle to a port where the vehicle is shipped out of the country or to a "chop shop" where the vehicle is rapidly separated into its component parts and sold off. All of this may take place before the vehicle is even reported stolen.

There are, accordingly, a great number of approaches towards preventing vehicle theft and a great many variants for such approaches. Some vehicle anti-theft devices utilize an alarm device which sounds when the vehicle is entered by an unauthorized person. However, many such alarm anti-theft devices sound even when the vehicle is touched by a passer-by and the alarm noise, which is annoying, has become so common-place that it is ignored. Not only does the constant sounding of such alarms place a drain on the vehicles battery but the apathy of people in range of the sound and their annoyance with such alarms has tended to leave the impression, more often than not, that it is just another false alarm and can be ignored. Auto thieves may rely on that and go about their business stealing the vehicle and shutting off the alarm in short order.

Other vehicles anti-theft and vehicle theft deterrent devices involve reinforcing vehicle locks, steering wheels and similar vehicle component lock-up devices. The auto-thieves, however, seem to learn how to by-pass or disconnect such devices and do so quickly as to appear to be the vehicle owner thus rendering such devices ineffective for their intended purposes.

There are devices for preventing vehicle wheel rotation and which thereby hopefully will prevent vehicle theft. Some such devices are shown, for example: in U.S. Pat. No. 4,031,726 issued on June 28, 1977 to G. De Jager for *Aircraft Anti-Theft Chock Device;* in U.S. Pat. No. 4,819,462 issued on Apr. 11, 1989 to S. Apsell for *Locking Clamp For A Trailer Tire-Carrying Wheel And The Like;* and in U.S. Pat. No. 4,878,366 issued on Nov. 7, 1989 to R. W. Cox for *Locking Device For A Vehicle Wheel And Tire.* However, such devices are obviously relatively heavy, cumbersome and expensive and such weight, expense and relative difficulty in use may deter their use.

Still other vehicle theft deterrent devices act to disable the vehicle by locking brakes or the steering wheel or by cutting off the ignition, fuel supply or the battery. Such anti-theft devices are built in or hidden within the vehicles mechanisms and the skilled thief seems to be quite able to disable such devices relatively quickly and in many instances while presenting the appearance of an authorized user of the vehicle looking for or adjusting something. In addition, such anti-theft systems or devices can be quite costly and, if so easily by-passed, very frustrating to the vehicle owner.

One manner of disabling a vehicle that rides on air inflated tires is to deflate one or more tires; and one way of accomplishing that is to do so in response to forces, such as centrifugal forces, generated by rotation of the vehicle wheel and tire. Examples of tire deflation devices for air inflated vehicle tires are shown in U.S. Pat. No. 2,737,223 issued on Mar. 6, 1956 to R. Plath for *Automatic Partial Deflating Apparatus For Vehicle Tires* and in U.S. Pat. No. 4,657,057 issued on Apr. 14, 1987 to J. S. Ha for *Safety Tire Valve For Controlling Speed Of Vehicle.* However, the device of the former such patent only partially deflates the tire permitting continued use of the vehicle and the device of the latter such patent is only responsive to excessive speeds which are usually not encountered in vehicle thefts.

The concept of tire deflation as a vehicle anti-theft device is further exemplified by mechanisms shown and described: in U.S. Pat. No. 3,003,539 issued on Oct. 10, 1961 to R. M. Tone for *Car Theft Tire Deflator;* in U.S. Pat. No. 3,910,221 issued on Oct. 7, 1975 to R. L. Aske et al for *Anti-Theft Device;* in U.S. Pat. No. 4,375,200 issued on Mar. 1, 1983 to G. A. Bertani et al for *Antitheft Device;* and in U.S. Pat. No. 4,818,029 issued on Apr. 4, 1989 to F. Mourot et al for *Vehicle Anti-Theft Device Making At Least One Wheel Unserviceable And A Wheel Comprising The Device.* However, such devices while relatively small in size do include considerable parts and mechanisms rendering same relatively costly and somewhat complex in how they operate. They function by releasing air from the tire through valve structures which must respond to centrifugally operated mechanism. If the car thief recognizes the device they can simply drive slowly so as not to actuate the device or so that the device releases the air so slowly that the vehicle can be moved to a new location. At that new location the thief may easily open the trunk and change the tire. It is so common to see someone change a tire the passers-by instead of calling the police may even offer assistance. Such devices are also so relatively small and unobtrusive that the thief may attempt to steal the vehicle because they do not recognize that an anti-theft device is in use. Such recognition is often in and of itself a theft deterrent.

SUMMARY OF THE INVENTION

It is therefore an object of this invention to provide a new and novel vehicle theft deterrent.

It is another object of this invention to provide a new and novel anti-theft device for a vehicle.

It is yet another object of this invention to provide a new and novel vehicle theft deterrent device that disables use of the vehicle.

It is still another object of this invention to provide a new and novel vehicle theft deterrent device that disables use of the vehicle by deflating at least one vehicle tire.

It is yet still another object of this invention to provide a new and novel vehicle anti-theft device that disables use of the vehicle by a relatively rapid deflation of at least one vehicle tire.

It is a further object of this invention to provide a new and novel vehicle theft deterrent device the presence and use of which is quite obvious and by being so obvious may deter vehicle theft by its mere presence.

Other objects, features, and advantages of the invention in its details of construction and arrangement of parts will be seen from the above, from the following description of the preferred embodiments when considered with the drawing and from the appended claims.

DESCRIPTION OF THE PREFERRED EMBODIMENT

Figure 1:
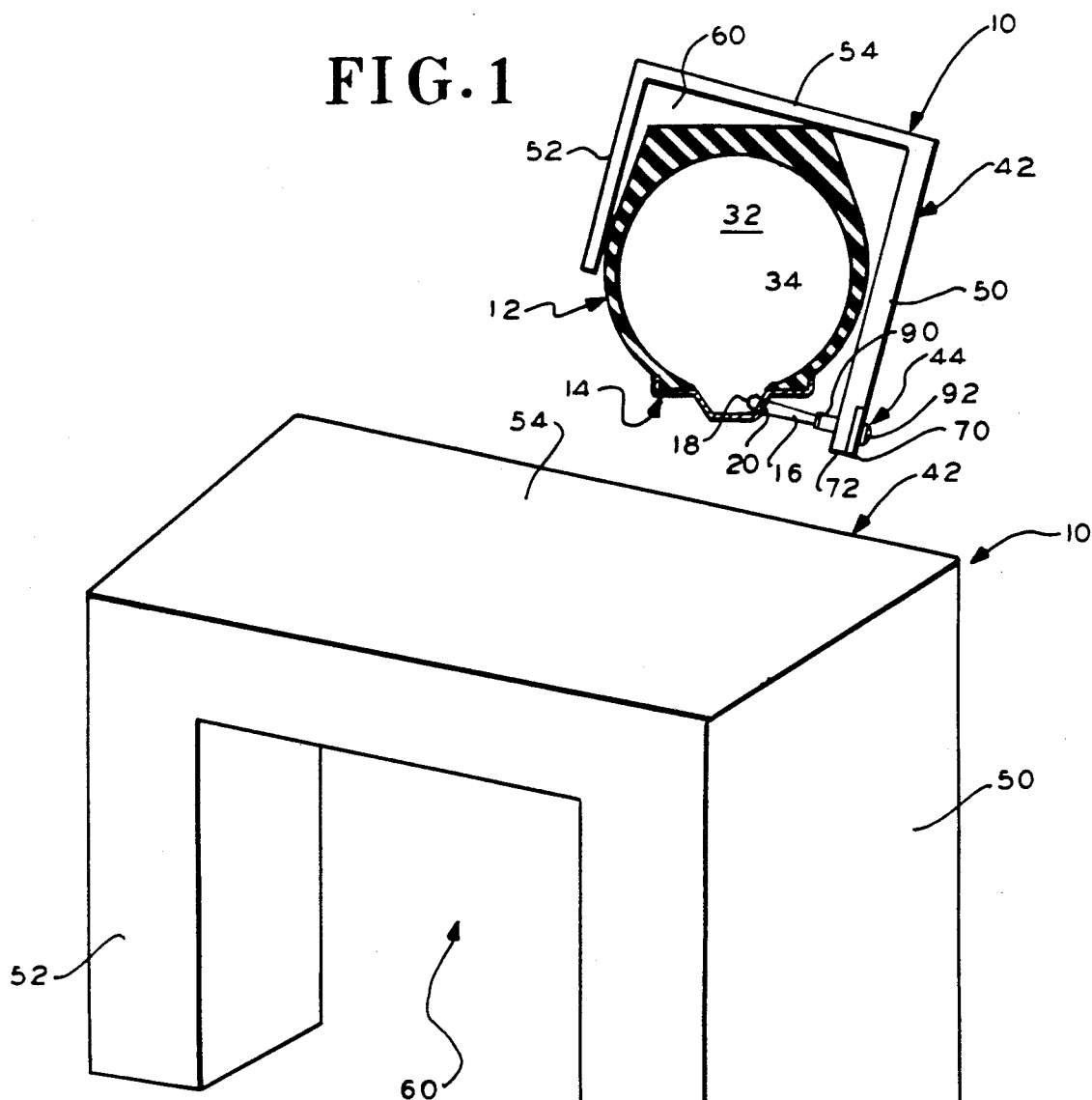
FIG 1 is a vertical sectional view through a portion of an air inflated vehicle tire and its mounting rim showing a theft deterrent device incorporating the instant invention applied thereto.
Figure 2:
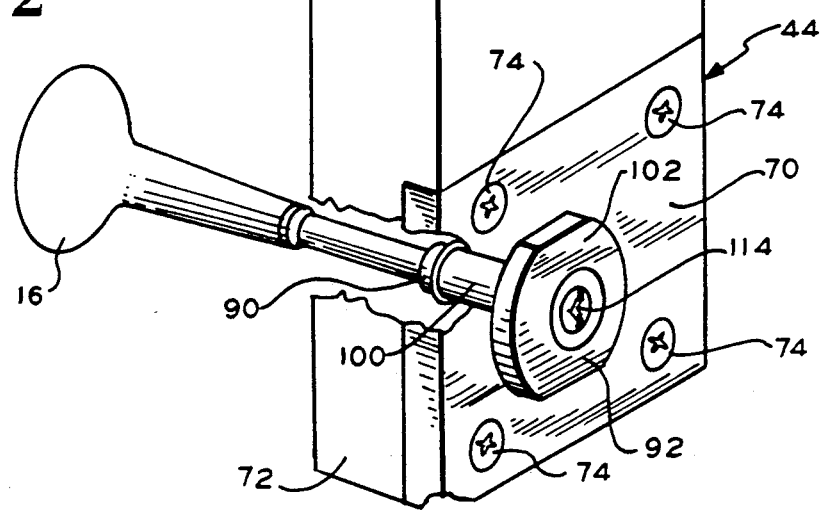
FIG. 2 is a perspective illustration of the vehicle theft deterrent device of FIG. 1 cut away in parts to better show details thereof.

With reference to FIGS. 1 and 2, there is generally shown at 10 a vehicle theft deterrent device, incorporating the instant invention, as it would be applied to an air-inflated vehicle tire 12 (FIG. 1). Tire 12 is of conventional construction and of the kind that is generally utilized on cars, trucks, busses, recreational vehicles and the like. It is conventionally mounted on a tire rim 14 that is, in turn, conventionally secured by lug-nuts or the like to a vehicle axle. An air valve stem 16 of conventional construction is fitted at one of its ends 18 through an opening 20 formed through rim 14. A conventional valving assembly 30 (FIG. 3) is provided within valve stem 16 to facilitate passage of air 32 into a space 34 within tire 12 and exit of air therefrom upon appropriate operation of valve assembly 30.

Vehicle theft deterrent device 10 includes a valve stem break-away-bar assembly 42 (FIGS. 1 and 2) and a valve stem locking latch assembly 44. Valve stem break-away-bar assembly 42 is in a substantially upside down "U" shaped configuration with a relatively long first leg 50 and a somewhat shorter second leg 52 connected together in spaced and generally parallel disposition by a connecting arm 54. A space 60 is formed and provided between legs 50 and 52 and arm 54 sufficient to receive therebetween air-inflated tire 12 (FIG. 1). The material from which valve stem break-away-bar assembly 42 is fabricated is preferably metal and it is of sufficient size and strength to carry the weight of the vehicle as transmitted through its tire and to perform the functions described hereinafter for break-away-bar assembly 42.

Valve stem locking latch assembly 44 (FIGS. 1 and 2) includes a latch plate 70 (FIGS. 1-3) secured to long leg 50 of break-away-bar assembly 42 proximate a lower end 72 thereof. A plurality of securing members, such as threaded fasteners 74, secure latch plate 70 to leg 50. Other conventional and suitable means may be utilized to secure latch plate 70 to leg 50 or, in the alternative, latch plate 70 may be formed unitarily with leg 50.

A centrally disposed lock opening 80 extends through latch plate 70 and is aligned with an opening 82 extending through leg 50 proximate its lower end 72. A connecting member 90 of a lock assembly 92 extends through opening 82 and is internally threaded at 94 (FIG. 3) to mate with external threads 96 formed on valve stem 16 and usually utilized to receive a conventional internally threaded valve stem cap or cover (not shown). A retaining ring 97 is seated in a groove 98 formed in a lock housing 100 and extending outwardly therefrom behind and for coaction with a wall 101 of plate 70 to retain lock assembly 92 in latch plate 70.

Figure 3:
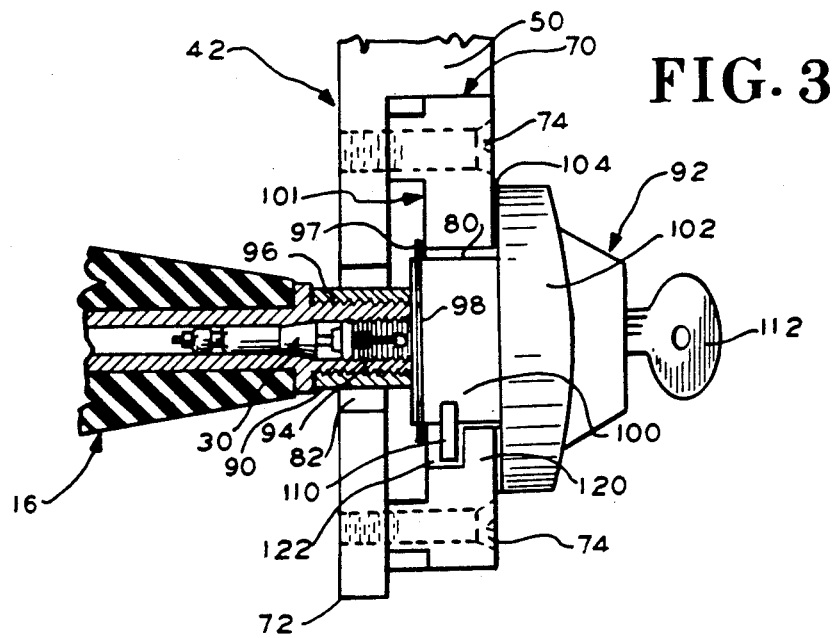
FIG. 3 is a plan view of the lock portion of the vehicle theft deterrent device of FIG. 2 in partial section to better show details thereof and showing same in locked condition.

With such valve stem cap or cover removed connecting member 90 is easily threaded onto valve stem threads 96 until fully seated with lock housing 100 positioned through opening 80 and with a lock plate 102 disposed up against a lock rib 104 formed on and projecting out from latch plate 70 and surrounding opening 80 thereof. Lock rib 104 and lock plate 102 are of substantially identical external configuration which is generally selected more for its aesthetics than function since there are many such configurations possible depending upon the structure of lock assembly 92. The lock structure of lock assembly 92 is also of conventional construction but one which includes a tang 110 that is housed within lock housing 100 and can be extended therefrom, as shown in FIG. 3, when a key 112 is inserted into key slot 114 (FIG. 2) and is turned to turn lock assembly 92 to its locked condition. When key 112 is turned to place lock assembly 92 into its unlocked condition tang 110 is withdrawn into lock housing 100. As such, lock member 90 may be unthreaded from valve stem 16 and device 10 removed from tire 12.

Figure 4:
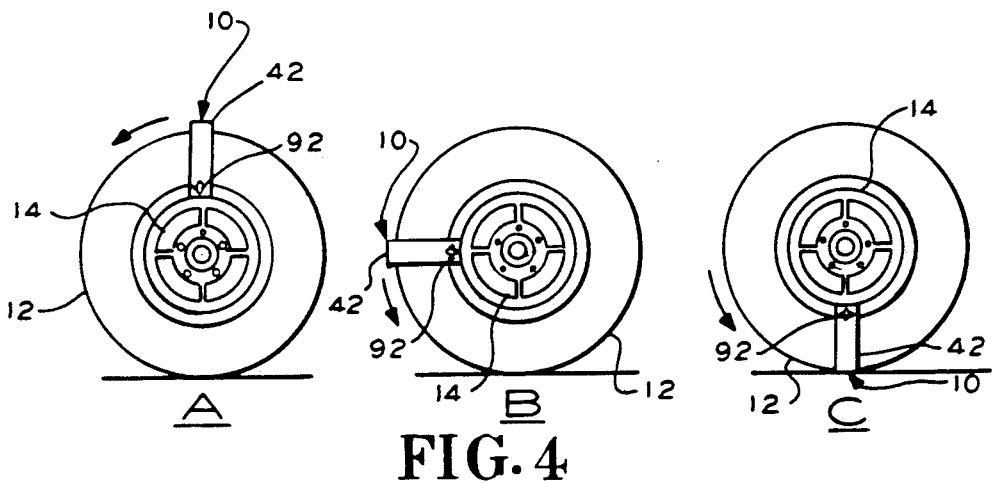
FIG. 4A, 4B and 4C are schematic illustrations of the vehicle theft deterrent device of FIGS. 1-3 showing same in various used on a vehicle air-inflated tire.

When lock assembly 92 is in its locked condition (FIG. 3), with its tang 110 extending out from lock housing 100, tang 110 projects behind a lip 120 formed in latch plate 70 and into a slot 122 formed therein. This prevents rotation of lock assembly 92 about valve stem 16 and therefore unthreading of member 90 thereof from valve stem threads 96 and withdrawal of locking assembly 92, latch assembly 44, break-away-bar assembly 42, and device 10 from tire 12. When so locked-up break-away-bar assembly 42 is disposed about tire 12 as shown in FIGS. 1 and 4A.

The exact proportions of the legs 50, 52 and arm 54 of break-away-bar assembly 42 and its disposition in relationship to a tire, such as tire 12, and its rim, such as rim 14, will depend upon the size and configuration of tire 12 and rim 14 and the disposition of valve stem 16. Break-away-bar assembly 42 is to be positioned so that it will be disposed about tire 12 and be secured in place thereon and to valve stem 16 by lock assembly 92, as shown in FIG. 3, when the vehicle upon which tire 12 is disposed is parked and to be secured against theft.

The obvious appearance of anti-theft device 10 on the vehicle tire in and of itself may be a sufficient deterrent. It clearly tells a would be thief that if this vehicle is taken something may happen; therefore, the thief may think twice and take another vehicle. If not, as the vehicle is driven tire 12 will rotate and deterrent device 10 will rotate with tire 12 from the disposition in FIG. 4A to that of FIG. 4B and then to that of FIG. 4C. If tire 12 is rotated in the opposite direction deterrent device 10 will rotate in that direction with tire 12 until device 10 is disposed under tire 12 as shown in FIG. 4C.

When device 10 is disposed beneath tire 12, as shown in FIG. 4C, the weight of the vehicle as transmitted through tire 12 and the configuration of legs 50, 52 of break-away-bar assembly 42 and its arm 54 is such that valve stem 16 will be ripped out of its disposition in opening 20 of tire rim 14 and a sufficient amount of the air 32 from tire 12 will escape rather rapidly, from opening 20 to render tire 12 flat and the vehicle undrivable. The deflation of tire 12 occurs after substantially one-half a revolution of tire 12 no matter which way it rotates and no matter how fast or slow the vehicle is driven.

Presumably or hopefully the driver will return and find their vehicle waiting where it was parked. They need merely insert key 112 in key slot 114 and rotate key 112 to move lock assembly 92 to its unlocked disposition. This action withdraws tang 110 into housing 100 and permits rotation of lock assembly 92 including its connecting members 90 in the proper direction to unthread it from valve stem 16. When lock assembly 92 is separated from valve stem 16 it along with break-away-bar assembly 42 can be removed from tire 12 and the vehicle is free to be driven.

Figure 5:
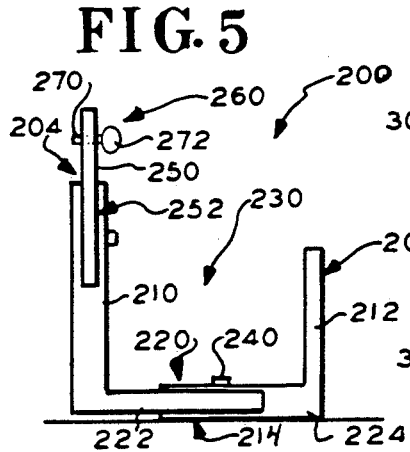
FIG. 5 is a schematic illustration of an alternative construction of a vehicle theft deterrent device incorporating the instant invention.

In FIG. 5 there is shown an alternative construction for a theft deterrent device 20 incorporating the instant invention. A break-away-bar assembly 202 and a locking latch assembly 204 cooperate in device 200 to deflate a vehicle tire (not shown) when applied thereto as described above for device 10 (FIGS. 1-4). Device 200, however, is constructed to be adjustable to accommodate tires of different size. In doing so a long leg 210 and a short leg 212 are provided for device 200 interconnected by a cross-arm 214.

A slip joint assembly 220 connects a first portion 222 and a second portion 224 of cross-arm 214. Slip joint 220 permits movement of portions 222 and 224 towards and away from each other to, in turn, space legs 210 and 212 at different distances from each other and thereby adjust the width of a space 230 provided therebetween to receive the width of the corresponding tire (not shown). A position securing mechanism 240 such as a set screw or other conventional structure coacts with portions 222, 224 to secure same and slip joint 220 is selected positions.

Similarly, an end 250 is provided for long leg 210 that is connected to leg 210 through a slip joint 252 that is relatively and selectively adjustable in the same manner as slip joint 220. A locking latch assembly 260 similar to assembly 44 of device 10 of FIGS. 1-4 is carried by end 250 and includes a lock assembly 270 that coacts with tire valve stem 272 in the manner that lock assembly 92 cooperates with valve stem 16.

Once slip joints 220 and 252 have been adjusted and fixed in position, so that device 200 can be applied to the vehicle tire, lock assembly 270 is secured to valve stem 272 and locked. If the vehicle is driven with device 200 so disposed, once device 200 is below the vehicles tire it will rip valve stem 272 out of its seat and the tire will deflate rendering the vehicle undrivable.

Figure 6:
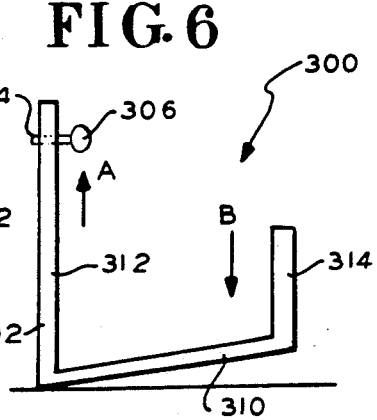
FIG 6 is a schematic illustration of another alternative construction of a vehicle theft deterrent device incorporating the instant invention.

In FIG. 6 there is shown an alternative construction for a theft deterrent device 300 incorporating the instant invention. A break-away-bar assembly 302 and locking latch assembly 304 cooperate with a valve stem 306 of a vehicle tire (not shown) when applied thereto as described for device 10 (FIGS. 1-4) and device 200 (FIG. 5). Device 300, however, is constructed with its cross-arm 310 connecting legs 312 and 314 so that cross-arm 310 is angled upwardly from long leg 312 to its place of connection to short leg 314. As such, when device 300 is applied to a vehicle tire (not shown) the coaction of the tire and device 300 will move short leg 314 down (direction of arrow B) into engagement with the road surface and long leg 312 up (direction of arrow A). This will move valve stem 306 up and in to rip valve stem 306 out of its seat in the tire rim (not shown) to deflate the tire.

Figure 7:
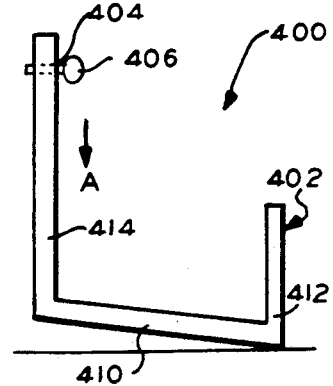
FIG. 7 is a schematic illustration of yet another alternative construction of a vehicle theft deterrent device incorporating the instant invention.

In FIG. 7 there is shown another alternative construction for a theft deterrent device 400 incorporating the instant invention. A break-away-bar assembly 402 and locking latch assembly 404 cooperate with a valve stem 406 of a vehicle tire (not shown) when applied thereto as described above for device 10 (FIGS. 1-4), device 200 (FIG. 5) and device 300 (FIG. 6). Device 400, however, is constructed with its cross-arm 410 angled downwardly from long leg 414 to its place of connection to short leg 412. As such, when device 400 is applied to a vehicle tire (not shown) the coaction of the tire and device 400 will move long leg 412 down (direction of arrow A) into engagement with the road surface. This will move valve stem 406 down and out to rip valve stem 406 out of its seat in the tire rim (not shown) to deflate the tire.

From the above descriptions it will thus be seen that there has been provided now and novel vehicle theft deterrent devices which are relatively simple in construction and use but very effective to deter theft of a vehicle and if an attempt is made to steal the vehicle act quickly and effectively to deflate the vehicle tire to which such device is applied to thereby render the vehicle undrivable.

It is understood that although there has been shown and described preferred embodiments of the invention that various modifications may be made in the details thereof without departing from the spirit as comprehended by the following claims.

What is claimed is:

1. The method of deterring movement of a vehicle that moves on air-inflated tires and for which there is an air-valve to facilitate passage of air into and out from the tires; comprising:
    (a) providing an air-valve extraction device carried by a valve extraction device operating means;
    (b) constructing the valve extraction device operating means of a size and configuration to be selectively positioned about at least a portion of a vehicle tire and for coaction therewith; and
    (c) selectively connecting the air-valve extraction device to the vehicle tire air-valve when said valve extraction device operating means is positioned for coaction with the vehicle tire;
    (d) said valve extraction device operating means coacting with a vehicle tire when positioned for coaction therewith such that said valve extraction device operating means is moved to a position underneath the vehicle tire upon predetermined movement of the vehicle tire to extract the air-valve and permit escape of the air from the vehicle tire.

2. The method of claim 1, including letting the air escape rapidly from the tire.

3. The method of claim 2, wherein the air-valve is disposed in a valve stem and the valve extraction device is selectively connectable to the valve stem and upon predetermined movement of the tire removes the valve stem.

4. The method of claim 3, wherein the predetermined tire movement places the tire upon the valve extraction device operating means.

5. The method of claim 4, including forming said valve extraction device operating means as in a substantially "U" shaped configuration.

6. The method of claim 5, including providing said air-valve extraction device as a key-lock activated device carried by said extraction device operating means.

7. The method of claim 6, including threadably connecting said air-valve extraction device to the air-valve.

8. The method of claim 7, including forming said "U" shaped configuration by providing a first leg and a second leg connected in spaced relationship by a cross-arm, including forming said second leg shorter than said first leg and directing said cross-arm at an angle between said first leg and said second leg.

9. A vehicle theft deterrent device to be disposed for coaction with an air-inflated vehicle tire when the tire is inflated with air and is disposed to facilitate vehicle movement, and with the air-valve that facilitates controlled passage of air into and out from the vehicle tire; comprising:
   (a) air-valve removal means of a size and configuration to be disposed for coaction with an air-inflated vehicle tire; and
   (b) air-valve connection means carried by said air-valve removal means and selectively connectable to the air-valve of the vehicle tire;
   (c) said air-valve removal means being disposable for coaction with a vehicle tire and connectable to the air-valve thereof by way of said air-valve connection means such that said air-valve removal means is moved to a position underneath the vehicle tire upon a predetermined rotation of the vehicle tire to remove the air-valve and thereby to permit escape of the air from the vehicle tire to deter movement of the vehicle.

10. The vehicle theft deterrent device of claim 9, wherein the air-valve is connected to the vehicle tire through a valve-stem and the air-valve connection means is connectable to the valve stem.

11. The vehicle theft deterrent device of claim 10, wherein the vehicle tire is disposed on a wheel rim and the valve stem is carried by the wheel rim.

12. The vehicle theft deterrent device of claim 11, wherein the valve stem is externally threaded at an end thereof and said air-valve connection means is internally threaded and coacts with the external threads of the valve stem.

13. The vehicle theft deterrent device of claim 12, wherein said air-valve removal means coacts with the vehicle tire upon said predetermined movement thereof to remove the valve stem and air-valve from the vehicle rim.

14. The vehicle theft deterrent device of claim 9, wherein said air-valve removal means includes a break-away-bar assembly means of a substantially "U" shaped configuration of a size and configuration to fit at least partially about a vehicle tire.

15. The vehicle theft deterrent device of claim 14, wherein said air-valve connection means includes a key-lock carried by said break-away-bar assembly means and which includes a key actuated tang which is a first position thereof permits connection of said air-valve connection means to the air-valve of a vehicle tire and disconnection of said air-valve connection means from the air-valve of a vehicle tire, and in a second position thereof prevents disconnection of said air-valve connection means from the air-valve of a vehicle tire.

16. The vehicle theft deterrent device of claim 9, wherein said air-valve removal means is selectively adjustable in a first manner to accommodate vehicle tires of different size and is selectively adjustable in a second manner to facilitate connection of said air-valve connection means to the tire air-valve.

17. The vehicle theft deterrent device of claim 16, wherein said selective adjustability is accomplished by the use of selectively settable slip joints.

18. The vehicle theft deterrent device of claim 14, wherein said break-away-bar assembly means includes a first leg, a second leg and a cross-arm connecting said first leg and said second leg in spaced substantially "U" shaped configuration.

19. The vehicle theft deterrent device of claim 18, wherein said first leg is longer than said second leg and said air-valve connection means is carried by said first leg.

20. The vehicle theft deterrent device of claim 19, wherein said cross-arm extends at an angle from said first leg to said second leg.

* * * * *